United States Patent
Jair et al.

(10) Patent No.: US 7,286,548 B1
(45) Date of Patent: Oct. 23, 2007

(54) METHOD AND APPARATUS FOR MULTICAST MULTIPLE PREFETCH

(75) Inventors: Hsinlun Jair, Fremont, CA (US); Kaiwen Lo, Fremont, CA (US)

(73) Assignee: Redback Networks Inc., San Jose, CA (US)

( * ) Notice: Subject to any disclaimer, the term of this patent is extended or adjusted under 35 U.S.C. 154(b) by 1234 days.

(21) Appl. No.: 10/237,388

(22) Filed: Sep. 9, 2002

Related U.S. Application Data

(60) Provisional application No. 60/403,269, filed on Aug. 14, 2002.

(51) Int. Cl.
 *H04L 12/56* (2006.01)
(52) U.S. Cl. ............... 370/412; 370/432; 710/60
(58) Field of Classification Search ........... 370/412, 370/432, 392, 401, 410
 See application file for complete search history.

(56) References Cited

U.S. PATENT DOCUMENTS 5,854,911 A * 12/1998 Watkins ............... 712/207
6,138,192 A * 10/2000 Hausauer ............. 710/100
6,760,817 B2 * 7/2004 Arimilli et al. ........ 711/137
7,046,687 B1 * 5/2006 Brown et al. ......... 370/412

OTHER PUBLICATIONS

Dan Li, Scalable Reliable Multicast and Its Application to Web Caching, Dissertation, Apr. 2000, pp. 1-147.
The NFS™ Distributed File Service, A White Paper from SunSoft, Nov. 1995, pp. 1-55, Mountain View, CA 94043.
Dave Thaler, Multicast Address Allocation MIB, Internet Engineering Task Force, Jan. 2003.

* cited by examiner

*Primary Examiner*—Ricky Q. Ngo
*Assistant Examiner*—Chandrahas Patel
(74) *Attorney, Agent, or Firm*—Blakely, Sokoloff, Taylor & Zafman LLP

(57) ABSTRACT

A method and apparatus for multicast multiple prefetch is described. A method in a network element comprises queuing a set of one or more prefetch requests, wherein a subset of the set of prefetch requests corresponds to a multicast packet, issuing a first of the subset of prefetch requests, and blocking each of the subsequent ones of the subset of prefetch requests.

30 Claims, 6 Drawing Sheets

METHOD AND APPARATUS FOR MULTICAST MULTIPLE PREFETCH

CROSS-REFERENCE TO RELATED APPLICATIONS

This application claims the benefit of U.S. Provisional Patent Application No. 60/403,269, entitled "Method and Apparatus for Multicast Multiple Prefetch" filed on Aug. 14, 2002.

BACKGROUND OF THE INVENTION

1. Field of the Invention

The invention relates to the field of communication. More specifically, the invention relates to communication networks.

2. Background of the Invention

Typically when a network element receives a packet to be multicast, the network element stores the packet in a central memory location and submits copies of the stored packet for transmission to multiple recipients.

FIG. 1 (Prior Art) is a diagram of a forwarding engine card and an input/output (I/O) card. In FIG. 1, a forwarding engine (FE) card 121 is coupled with a shared bus 111. An I/O card 113 is also coupled with the shared bus 111. The FE card 121 includes a packet processing module (PPM) 105, a memory 107, and an FE controller 109.

The PPM 105 receives a packet from an I/O card and stores the packet in memory 107. The PPM determines where the stored packets is to be transmitted and provides the location of the stored jacket to the appropriate I/O card. The PPM 105 provides the target location to an I/O card through the FE controller 109. The FE controller 109 places data on the shared bus 111 to be carried to the appropriate I/O card.

The I/O card 113 includes an I/O controller 101 and a framer 103. The I/O controller 101 receives data from the shared bus 111, including packets and a target location(s) for packets, and passes this data to the framer 103. The framer 103 processes packets and transmits processed packets.

The framer 103 issues prefetch requests for packets through the I/O controller 101. In multicast scenarios, the FE card 121 provides a data to the I/O card faster than expected because the same target location is being requested multiple times in sequence. The FE controller 109 provides the data is just pulled from the memory 107 to service the previous prefetch request.

If a sequence of prefetch requests include multiple prefetch requests for a multicast packet and a prefetch request for a different packet, then the data integrity may be compromised. For example, assume a sequence of four prefetch requests are issued. The first, second and fourth prefetch requests are for a first packet to be multicast. The third prefetch request is for a second packet. The FE controller 109 can provide the first packet in response to the fourth prefetch request before the second packet is provided for the third prefetch request, since the FE controller 109 has already fetched the first packet for the first and second prefetch requests. Hence, the I/O card 113 will receive the first packet for the third prefetch request, which is the wrong packet for the third prefetch request.

BRIEF SUMMARY OF THE INVENTION

A method and apparatus for multicast multiple prefetch is described. According to one aspect of the invention, a method in a network element provides for queuing a set of one or more prefetch requests, wherein a subset of the set of the prefetch requests corresponds to a multicast packet, issuing a first of the subset of prefetch requests, and blocking each of the subsequent ones of the subset of prefetch requests.

These and other aspects of the present invention will be better described with reference to the Detailed Description and the accompanying Figures.

BRIEF DESCRIPTION OF THE DRAWINGS

The invention may best be understood by referring to the following description and accompanying drawings that are used to illustrate embodiments of the invention. In the drawings.

DETAILED DESCRIPTION OF THE INVENTION

In the following description, numerous specific details are set forth to provide a through understanding of the invention. However, it is understood that the invention may be practiced without these specific details. In other instances, well-known circuits, structures, standards, and techniques have not been shown in detail in order not to obscure the invention.

Figure 1:
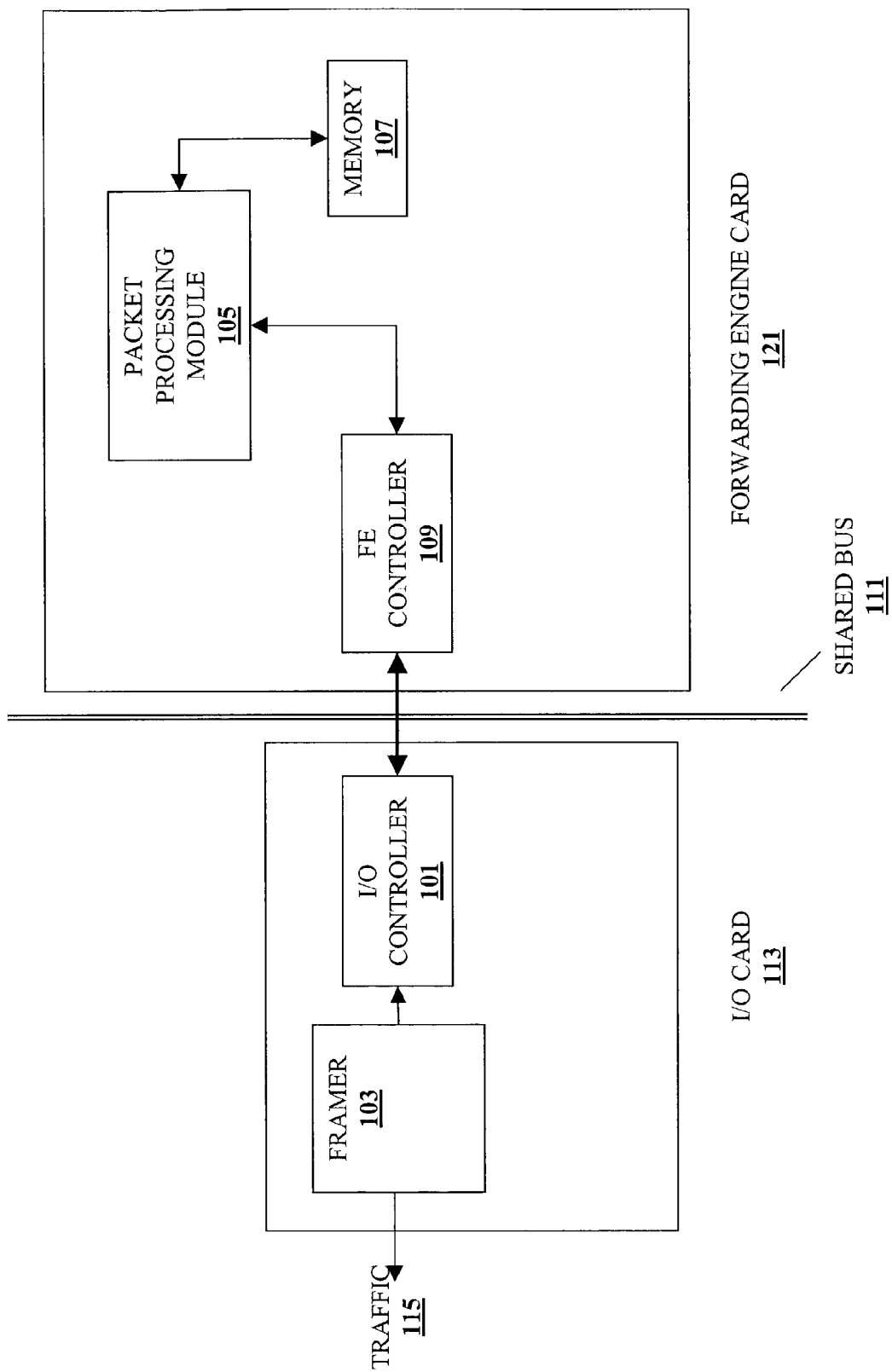
FIG. 1 (Prior Art) is a diagram of a forwarding engine card and an input/output (I/O) card.
Figure 2:
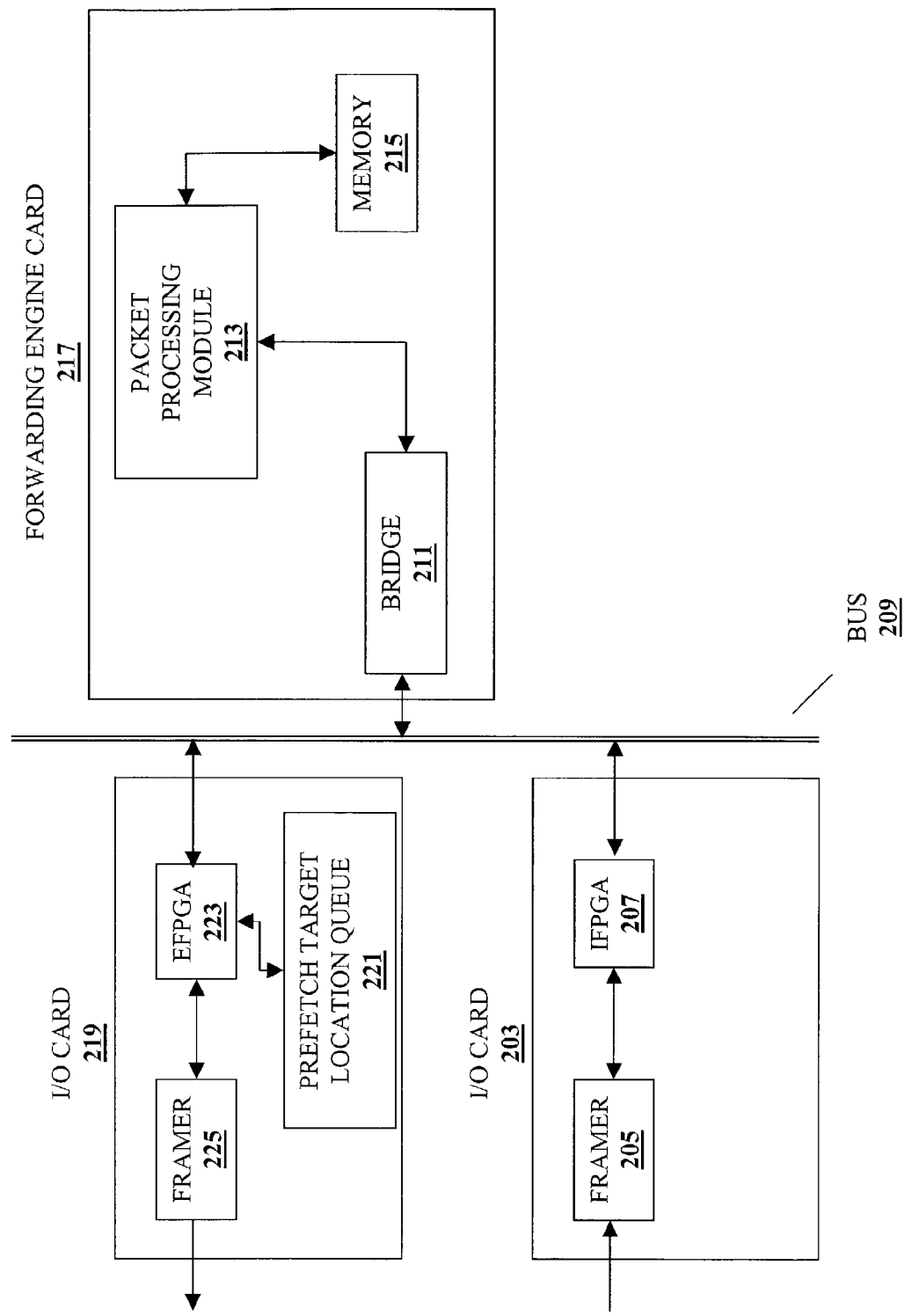
FIG. 2 is an exemplary diagram of a forwarding engine card and input/output cards of a network element according to one embodiment of the invention.

FIG. 2 is an exemplary diagram of a forwarding engine card and input/output cards of a network element according to one embodiment of the invention. In FIG. 2, a forwarding engine (FE) card 217 and input/output (I/O) cards 203 and 219 are coupled with a bus 209 (e.g., PCI, ISA, LDT, etc.). The FE card includes a packet processing module (PPM) 213, a bridge 211, and memory 215. The I/O card 219 includes a framer 225, an egress field programmable gale array (EFPGA) 223, and a prefetch target location queue 221. The I/O card 203 includes a framer 205 and an ingress FPGA (IFPGA) 207.

The I/O card 203 receives a packet to be multicast. The framer 205 processes the header of the received packet before passing it on to the IFPGA 207. The IFPGA 207 stores the packet in the memory 215 of the FET card 217 over the bus 209 in accordance with a location previously provided by the FE card 217. The PPM 213 determines that the packet is to be multicast and determines which I/O card(s) will transmit the multicast packet. In this example, the I/O card 219 will transmit the multicast packet. The PPM 213 provides the EFPGA 223 the location of the multicast packet via the bridge 211 and the bus 209. The EFPGA 223 queues prefetch requests. The EFPGA 223 stores in the prefetch target memory queue 221 target memory locations that correspond to the queued prefetch requests. The EFPGA 223 issues queued prefetch requests as long as its target memory location does not match a target memory location of a preceding prefetch request.

After the EFPGA 223 receives a packet to be transmitted, the EFPGA 223 passes the packet to the framer 225 which processes the packet for transmission and transmits the packet.

Figure 3:
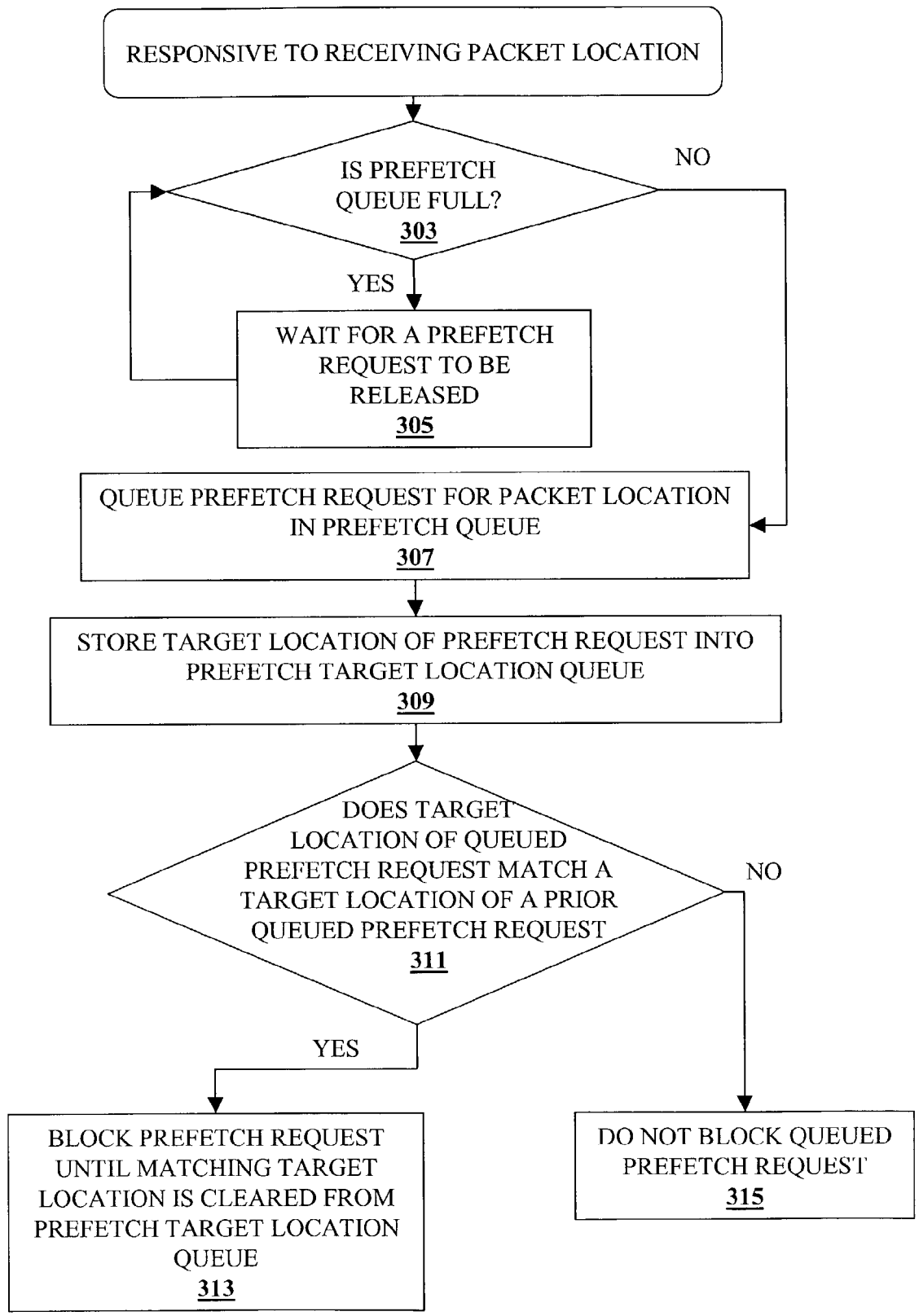
FIG. 3 is an exemplary flow chart for queuing prefetch requests according to one embodiment of the invention.

FIG. 3 is an exemplary flow chart for queuing prefetch requests according to one embodiment of the invention. At block 303, it is determined if the prefetch queue is full in response to receiving a packet location. If the prefetch queue is full, then control flows to block 305. If the prefetch queue is not full, then control flows to block 307.

At block 305, a prefetch request is awaited to be released from the prefetch queue. From block 305, control flows back to block 303.

At block 307, a prefetch request for the received packet location is queued in the prefetch queue. At block 309, the target location of the prefetch request is stored into a prefetch target location queue. At block 311, it is determined if the target location fo the queued prefetch request matches a target location of a prior queued prefetch request. If the target location of the queued prefetch request matches the target location of a prior queued prefetch request, then control flows to block 313. If the target location of the queued prefetch request does not match the target location of a prior queued prefetch request, then control flows to block 315.

At block 315, the queued prefetch request is not blocked.

At block 313, the queued prefetch request is blocked.

Figure 4:
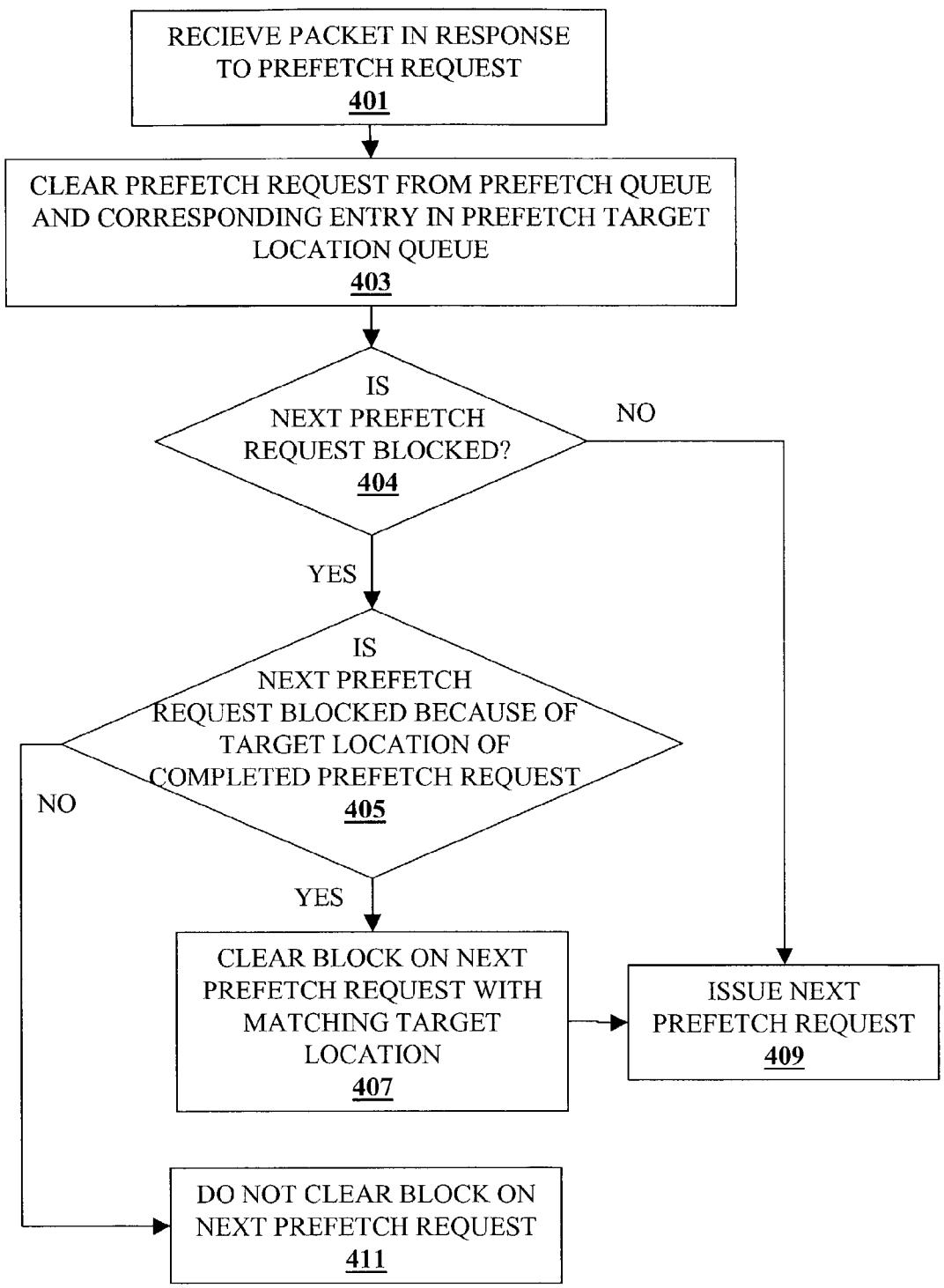
FIG. 4 is an exemplary flowchart for issuing a blocked prefetch request according to one embodiment of the invention.

FIG. 4 is an exemplary flowchart for issuing a blocked prefetch request according to one embodiment of the invention. At block 401, a packet is received in response to a prefetch request. At block 403, the serviced prefetch request is cleared from the prefetch queue and a corresponding entry in the prefetch target location queue is cleared. At block 404, it is determined if the next prefetch request is blocked. If the next prefetch request is blocked, then control flows to block 405. It the next prefetch request is not blocked, then control flows to block 409.

At block 409, the next prefetch request is issued.

At block 405 it is determined if the next prefetch request is blocked because of the target location of the serviced prefetch request. If the next prefetch request is blocked because of the serviced prefetch request, then control flows to block 407. If the next prefetch request is not blocked because of the service prefetch request, then control flows to block 411.

At block 407, the block on the next prefetch request with a matching target location is cleared. From block 407 control flows to block 409.

At block 411, the block on the next prefetch request is not cleared.

Blocking subsequent multicast prefetch requests maintains integrity of the sequence of prefetch requests. In addition, the optimization provided by prefetch requests does not have to be balanced against the possibility of invalid data being returned for a prefetch request.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

For example, block 309 may be performed before block 307 in alternative embodiments of the invention. In addition, in FIG. 3, block 303 may be performed in response to a trigger other than receiving a packet location, such as a timer, or changing of a flag when a prefetch request has been serviced.

In FIG. 4, block 403 may be performed separately or in parallel in alternative embodiments of the invention. Furthermore, block 404 may be performed after block 405.

Figure 5:
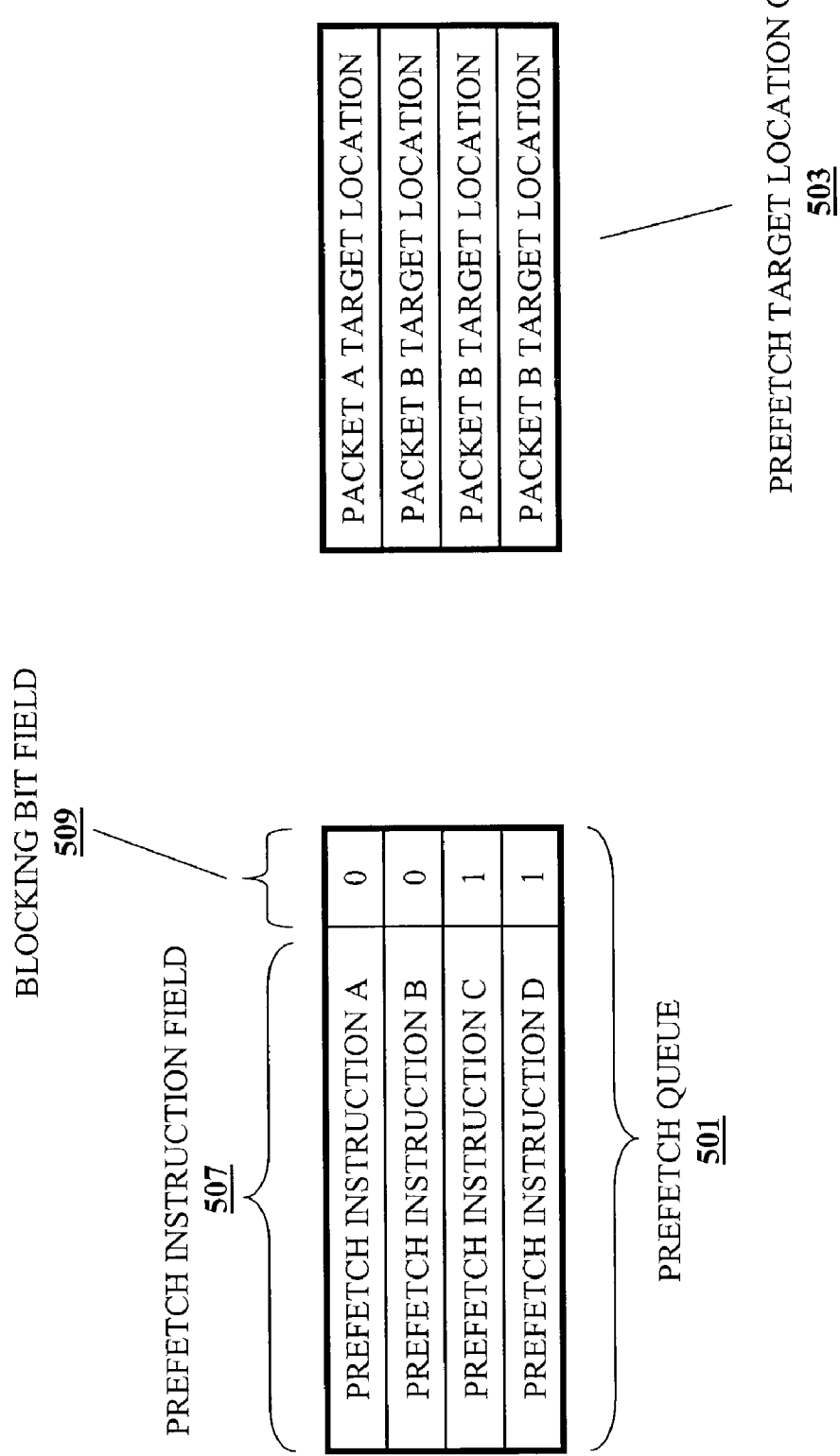
FIG. 5 is an exemplary diagram illustrating a blocking mechanism according to one embodiment of the invention.

FIG. 5 is an exemplary diagram illustrating a blocking mechanism according to one embodiment of the invention. In FIG. 5, a prefetch queue 501 includes x entries. Each entry in the prefetch queue 501 includes a prefetch instruction field 507 and a blocking bit field 509. The prefetch instruction field 507 will include a prefetch request or instruction, while the corresponding blocking bit field 509 will indicate whether the prefetch instruction should be blocked. FIG. 5 also includes a prefetch target location queue 503. The prefetch target location queue 503 also includes x entries. Each entry in the prefetch target location queue indicates a packet target location.

In the example illustrated in FIG. 5, the prefetch queue 501 and the prefetch target location queue each include 4 entries. The window of prefetch requests can be smaller or larger (e.g., 3 entries, 10 entries, etc.). The blocking bits fields 509 for the third and fourth entry of the prefetch queue 501 are set to block their corresponding prefetch instructions. The second, third, and fourth entries in the prefetch target location queue indicate the same target location for a packet B. Hence, the first prefetch instructions in the first and second entries of the prefetch queue 501 will be issued while the prefetch instruction of the third and fourth entries will be blocked until the second prefetch instruction has been completed. Once the second prefetch instruction is completed, the third prefetch instruction will be issued, but the fourth prefetch instruction will be blocked.

The blocking mechanism illustrated in FIG. 5 is exemplary. A variety of techniques can be utilized to block prefetch requests. In an alternative embodiment of the invention, a blocking bit is not utilized. Instead, each time a prefetch request is completed, the next prefetch request is compared to the previous target location before it is cleared. In another embodiment of the invention, a prefetch request for a different packet is allowed to bubble up past blocked prefetch requests.

Figure 6:
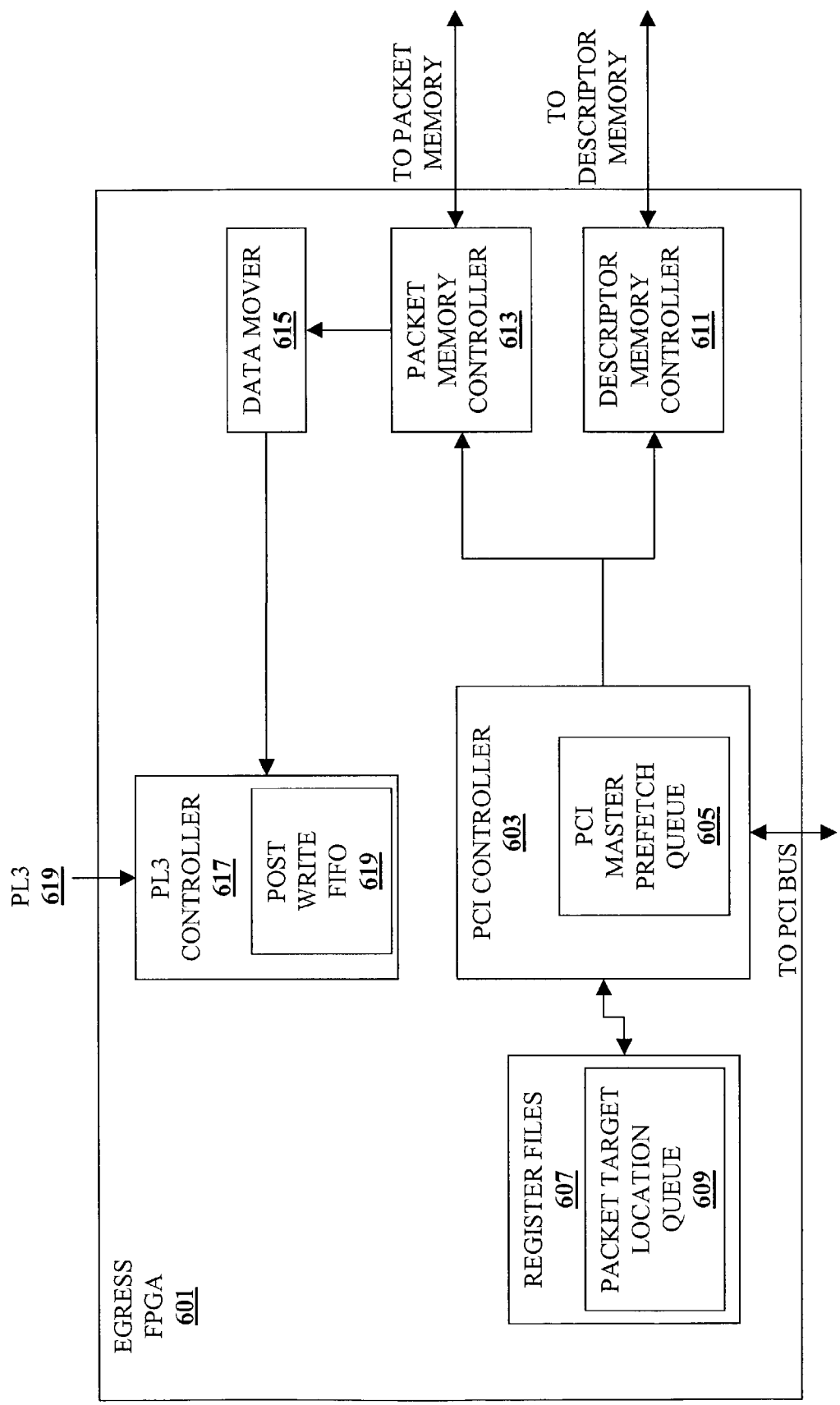
FIG. 6 is a diagram of an exemplary EFPGA according to one embodiment of the invention.

FIG. 6 is a diagram of an exemplary EFPGA according to one embodiment of the invention. In FIG. 6, an EFPGA 601 includes register files 607, a PCI controller 603, a descriptor memory controller 611, a packet memory controller 613, a data mover 615, and a PL3 controller 617. The register files 607 include a packet target location queue 609. The PCI controller 603 includes a PCI master prefetch queue 605. The PL3 controller 617 includes a post write FIFO 619.

A forwarding engine provides a target location of a packet to the EFPGA 601. The PCI controller 603 passes the target location to the descriptor memory controller 611. The descriptor memory controller 611 then writes the target location into a descriptor memory. The EFPGA 601 generates a prefetch request based on the received target location. The prefetch request is queued in the PCI master prefetch queue 605. The target location is stored in the packet target location queue 609. The received packet is stored in a packet memory by the packet memory controller 613. Once the entire packet has been received, the packet is assembled and passed to the data mover 615. The data mover 615 passes the packet to the PL3 controlled 617. The packet is queued in the post write FIFO 619 before being transmitted by the PL3 controller 617 to a framer via a PL3 line 619.

The I/O cards and the FE cards described in the Figures include memories, processors, and/or ASICs. Such memories include a machine-readable medium on which is stored a set of instructions (i.e., software) embodying any one, or all, of the methodologies described herein. Software can reside, completely or at least partially, within this memory and/or within the processor and/or ASICs. For the purpose of this specification, the term "machine-readable medium" shall be taken to include any mechanism that provides (i.e., stores and/or transmits) information in a form readable by a machine (e.g., a computer). For example, a machine-readable medium includes read only memory ("ROM"), random access memory ("RAM"), magnetic disk storage media, optical storage media, flash memory devices, electrical, optical, acoustical, or other forms of propagated signals (e.g., carrier waves, infrared signals, digital signals, etc.), etc.

While the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

We claim:

1. A method in a network element comprising:
   queuing a plurality of prefetch requests, wherein a subset of the plurality of prefetch requests corresponds to a multicast packet stored at a first target location;
   issuing a first of the subset of prefetch requests corresponding to the multicast packet stored at the first target location;
   determining that the target locations of subsequent ones of the queued subset of prefetch requests match the first target location of the issued first of the subset of prefetch requests;
   blocking each of the subsequent ones of the subset of prefetch requests;
   determining that the target location of another one of the plurality of prefetch requests does not match a target location of a prior queued prefetch request, the prior queued prefetch requests including the first of the subset of prefetch requests, the another one of the plurality of prefetch requests corresponding to a packet stored at a second target location;
   issuing the another one of the plurality of prefetch requests;
   unblocking a next one of the subsequent ones of the subset of prefetch requests after the first of the subset of prefetch request has been serviced; and
   issuing the next of the subset of prefetch requests corresponding to the multicast packet stored at the first target location.

2. The method of claim 1 wherein blocking comprises setting a blocking value for each of the subsequent ones of the prefetch requests.

3. The method of claim 2 wherein the blocking value is a bit.

4. The method of claim 1 further comprising for each of the queued subset of prefetch requests, storing a corresponding target location.

5. The method of claim 4 wherein blocking comprises:
   setting blocking bits of the queued subset of prefetch requests.

6. A method in a network element comprising:
   queuing a sequence of prefetch requests, each of the sequence of prefetch requests including a target memory location;
   storing each of the target memory locations for each prefetch request of the sequence of prefetch requests;
   issuing a first of the prefetch requests;
   determining if the target memory location of a second of the sequence of prefetch requests matches the target memory location of the first of the sequence of prefetch requests;
   issuing the second prefetch request if the target memory location of the second prefetch request does not match the target memory location of the first prefetch request; and
   blocking the second prefetch request if the target memory location of the second prefetch request matches the target memory location of the first prefetch request.

7. The method of claim 6 wherein blocking comprises setting a blocking value.

8. The method of claim 7 wherein the blocking value is a bit.

9. The method claim 6 further comprising issuing unblocked ones of the sequence of prefetch requests.

10. The method of claim 6 further comprising blocking any subsequent ones of the sequence of prefetch requests with a target memory location that matches issued ones of the sequence of prefetch requests.

11. The method of claim 6 further comprising unblocking the second prefetch request in response to the first prefetch request being serviced, if the second prefetch request was blocked.

12. A network element comprising:
    a bus;
    a forwarding engine (FE) card coupled with the bus, the FE card having a packet memory, a packet processing module, and a controller;
    an ingress field programmable gate array (FPGA) coupled with the bus; and
    an egress FPGA coupled with the bus to make prefetch requests for multicast packets and non-multicast packets, the egress FPGA having,
    a bus controller that includes a prefetch queue to store a plurality of prefetch requests, said prefetch queue including a block field and a prefetch request field for each entry in the prefetch queue, each said block field to be set to block its prefetch request while a target location is the same as that of a preceding unserviced queued prefetch request for the same multicast packet, each said block field to be set to indicate not blocked when the target location is not the same as that of any preceding unserviced queued prefetch request; and
    a set of one or more registers to store target memory locations.

13. The network element of claim 12 wherein the block field is a single bit field.

14. The network element of claim 12 wherein the bus is a PCI bus.

15. The network element of claim 12 wherein the set of registers include a packet target location queue.

16. The network element of claim 12 wherein the egrees FPGA further includes:
    a packet memory controller coupled with the bus controller;
    a description memory controller coupled with the bus controller;
    a data mover coupled with the packet memory controller; and
    a PL3 controller coupled with the data mover.

17. A network comprising:
    a first network element transmitting a multicast packet;

a second network element in communication with the first network element, the second network element having,
a forwarding engine receiving the multicast packet and storing the multicast packet in a target memory location in a packet memory, and
an input/output card having, a prefetch queue,
queuing a plurality of prefetch requests, wherein a subset of the plurality of prefetch requests corresponds to a multicast packet stored at a first target location;
issuing a first of the subset of prefetch requests corresponding to the multicast packet stored at the first target location;
determining that the target locations of subsequent ones of the queued subset of prefetch requests match the first target location of the issued first of the subset of prefetch requests;
blocking each of the subsequent ones of the subset of prefetch requests;
determining that the target location of another one of the plurality of prefetch requests does not match a target location of a prior queued prefetch request, the prior queued prefetch requests including the first of the subset of prefetch requests, the another one of the plurality of prefetch requests corresponding to a packet stored at a second target location;
issuing the another one of the plurality of prefetch requests;
unblocking a next one of the subsequent ones of the subset of prefetch requests after the first of the subset of prefetch request has been serviced; and
issuing the next of the subset of prefetch requests corresponding to the multicast packet stored at the first target location.

18. The network of claim 17 wherein the second network element further includes a set of registers to host target memory locations indicated by the queued prefetch requests.

19. The network of claim 17 wherein the prefetch queue of the second network element includes a prefetch request field and a blocking field.

20. A machine-readable medium that provides instructions, which when executed by a set of one or more processors, cause said set of processors to perform operations comprising:
queuing a plurality of prefetch requests, wherein a subset of the plurality of prefetch requests corresponds to a multicast packet stored at a first target location;
issuing a first of the subset of prefetch requests corresponding to the multicast packet stored at the first target location;
determining that the target locations of subsequent ones of the queued subset of prefetch requests match the first target location of the issued first of the subset of prefetch requests;
blocking each of the subsequent ones of the subset of prefetch requests;
determining that the target location of another one of the plurality of prefetch requests does not match a target location of a prior queued prefetch request, the prior queued prefetch requests including the first of the subset of prefetch requests, the another one of the plurality of prefetch requests corresponding to a packet stored at a second target location;
issuing the another one of the plurality of prefetch requests;
unblocking a next one of the subsequent ones of the subset of prefetch requests after the first of the subset of prefetch request has been serviced; and
issuing the next of the subset of prefetch requests corresponding to the multicast packet stored at the first target location.

21. The machine-readable medium of claim 20 wherein blocking comprises setting a blocking value for each of the subsequent ones of the prefetch requests.

22. The machine-readable medium of claim 21 wherein the blocking value is a bit.

23. The machine-readable medium of claim 20 further comprising for each of the queued subset of prefetch requests, storing a corresponding target location.

24. The machine-readable medium of claim 21 wherein blocking comprises:
setting blocking bits of the queued subset of prefetch requests.

25. A machine-readable medium that provides instructions, which when executed by a set of one or more processors, cause said set of processors to perform operations comprising:
queuing a sequence of prefetch requests, each of the sequence of prefetch requests including a target memory location;
storing each of the target memory locations for each prefetch request of the sequence of prefetch requests;
issuing a first of the sequence of prefetch requests;
determining if the target memory location of a second of the sequence of prefetch requests matches the target memory location of the first of the sequence of prefetch requests;
issuing the second prefetch request if the target memory location of the second prefetch request does not match the target memory location of the first prefetch request; and
blocking the second prefetch request if the target memory location of the second prefetch request matches the target memory location of the first prefetch request.

26. The machine-readable medium of claim 25 wherein blocking comprises setting a blocking value.

27. The machine-readable medium of claim 26 wherein the blocking value is a bit.

28. The machine-readable medium of claim 25 further comprising issuing unblocked ones of the sequence of prefetch requests.

29. The machine-readable medium of claim 25 further comprising blocking any subsequent ones of the sequence of prefetch requests with a target memory location that matches issued ones of the sequence of prefetch requests.

30. The machine-readable medium of claim 25 further comprising unblocking the second prefetch request in response to the first prefetch request being serviced, if the second prefetch request was blocked.

* * * * *